United States Patent [19]

Wagner

[11] 3,999,324
[45] Dec. 28, 1976

[54] FISHING LURE HAVING A QUICK GRASP AND RELEASE LINE HOLDER

[76] Inventor: Lawrence R. Wagner, 5919 E. 33rd Court, Apt. 3, Tulsa, Okla. 74135

[22] Filed: Sept. 2, 1975

[21] Appl. No.: 609,665

Related U.S. Application Data

[63] Continuation-in-part of Ser. No. 496,383, Aug. 12, 1974, Pat. No. 3,939,594.

[52] U.S. Cl. .............................. 43/42; 43/42.49; 43/44.91; 43/44.92
[51] Int. Cl.² ........................................ A01K 85/00
[58] Field of Search ........... 43/44.87, 44.88, 44.91, 43/44.92, 44.95, 42.49, 43.12, 43.14, 42

[56] References Cited
UNITED STATES PATENTS 3,939,594  2/1976  Wagner .......................... 43/42.49

*Primary Examiner*—Louis G. Mancene
*Assistant Examiner*—Peter K. Skiff
*Attorney, Agent, or Firm*—Head, Johnson & Chafin

[57] ABSTRACT

A fishing lure having an integral quick grasp and release line holder including a lure body having a line receiving opening in the front end, a metal holder housing positioned in the lure body, the holder housing having a cavity therein with a rectangular cross-section with tapered top and bottom surfaces and an opening in the small end in alignment with the opening in the lure body, a tapered wedge positioned in the holder housing having the same taper as the top and bottom surfaces of the cavity of the housing, a spring positioned in the housing urging the tapered wedge towards the small end of the cavity and an actuator in the form of a rotatable gear positioned in the lure body, a portion of the periphery of the gear extending externally of the lure body, the gear having engagement with the wedge inside the holder housing whereby the user may rotate the gear to retract the wedge permitting the insertion of a fishing line between the wedge top surface of the holder housing cavity, upon release the spring urging the wedge into engagement with the line thereby attaching the line to the lure.

7 Claims, 16 Drawing Figures

FISHING LURE HAVING A QUICK GRASP AND RELEASE LINE HOLDER

CROSS-REFERENCE

This is a continuation-in-part of application No. 496,383, entitled "FISH LINE HOLDER," filed Aug. 12, 1974, now U.S. Pat. No. 3,939,594.

BACKGROUND AND OBJECTS OF THE INVENTION

Fishing lures are universally provided with an eye hook at the forward end by which a fishing line is attached. Usually fishermen attach a swivel having a snap release to the end of their fishing lines. The snap release is then inserted in the eye in the front of the lure so that the fisherman can easily and quickly replace a lure with a different lure without tying and untying a knot at the end of the fishing line. This arrangement works satisfactorily except the eye hook and the snap release swivel destroys the appearance of the lure. In addition, the knot by which the line is tied to the snap release swivel usually has a lower breaking strength than the line itself.

In patent application Ser. No. 496,383, a quick grasp and release line holder is provided as a means of attaching a fishing line to a swivel for subsequent attachment to a fishing lure. The present disclosure is directed toward utilizing the basic concept of the existing application except means is provided wherein the quick grasp and release is integral with the fishing lure and encompassed within the fishing lure body so that no attachment means extends externally of the fishing lure.

It is therefore an object of this invention to provide a fishing lure having an integral fishing line grasping and releasing means.

More particularly, an object of this invention is to provide a fishing lure having an opening in the forward end thereof for receiving a fishing line and having a fishing line holder mounted within the fishing lure with an actuator extending from the holder through a slot in the fishing lure, a portion of the actuator extending externally of the lure for actuation by the user of the lure, whereby a fishing line may be inserted into the lure and retained by the holder and released when desired.

These and other objects and a better understanding of the invention will be had by reference to the following description and claims, taken in conjunction with the attached drawings.

DESCRIPTION OF THE VIEWS

FIG. 1 is a side elevational view of a fishing lure employing the invention.

DETAILED DESCRIPTION

Figure 11:
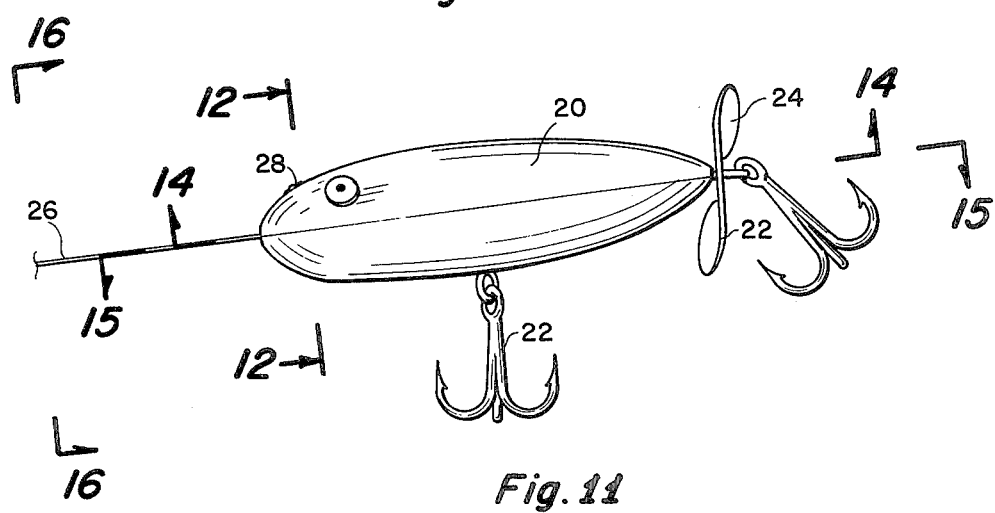

Referring to the drawings and first to FIG. 11 a fishing lure is illustrated of a general type which encompasses the principles of this invention. The fishing lure includes a body 20 having hooks 22 extending therefrom. A spinner 24 is illustrated as being typically employed in a fishing lure. It is understood that the lure illustrated is by way of example only and not intended to imply the ultimate configuration of the fishing lure which may employ this invention. Fishing lures vary greatly in design and detail. However, all are common in that they must have means for attachment of a fishing line 26. Normally, an eye hook (not shown) is affixed to the front of the lure 20 by which a line may be attached or, more usually, a swivel type snap release is affixed to the fishing lure 26 and to an eye hook to removably attach the lure to the line. By the present invention, the fishing line 26 attaches directly to the lure without any external attachment means to thereby preserve as much as possible the appearance of the lure and to provide a means for more easily and expeditiously attaching a line to the lure.

Extending from the top of the lure body 20 is an actuator 28 by which the line 26 may be released from the lure, the actuator being activated by the fingernail of the user. The function of the actuator 28 will be described in greater detail subsequently.

Figure 3:
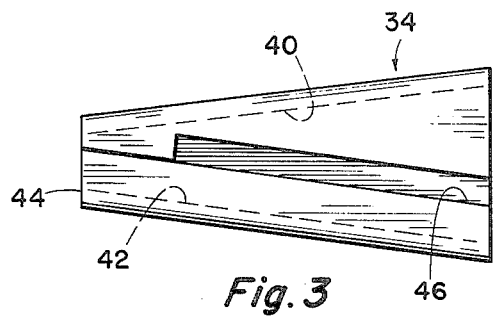
FIG. 3 is an elevational view of one side of the formed holder housing.
Figure 2:
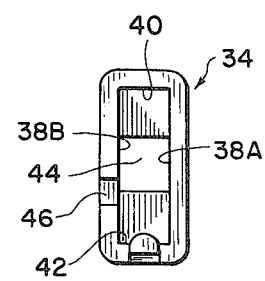
FIG. 2 is an end view of the holder housing as formed from the sheet of FIG. 1.
Figure 4:
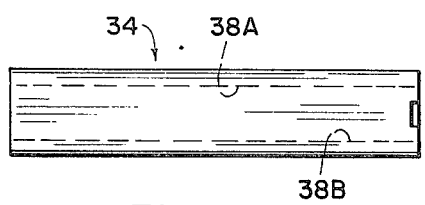
FIG. 4 is a bottom view of the formed holder housing.

Referring to FIGS. 1 through 4, a holder housing is illustrated, including means of economically manufacturing and assembling the holder housing. The housing may be formed, as illustrated, by a flat sheet of metal 30 cut to preselected dimensions and of a shape shown in FIG. 1. The metal is bent along four lines 32A through 32D to form the housing which is illustrated in FIGS. 2–4. The completed holder housing is generally indicated by the numeral 34. The housing 34 has an internal cavity defined by a rectangular cross-section formed of a first and second parallel side walls 38A and 38B, a top surface 40 and a bottom surface 42. The top and bottom surfaces are tapered towards each other with a preselected angle. The small end of the cavity opens at 44 to the outside of the housing. The housing has a slot opening 46 in the cavity side 38, the slot opening being parallel with the cavity bottom surface 42.

Figure 5:
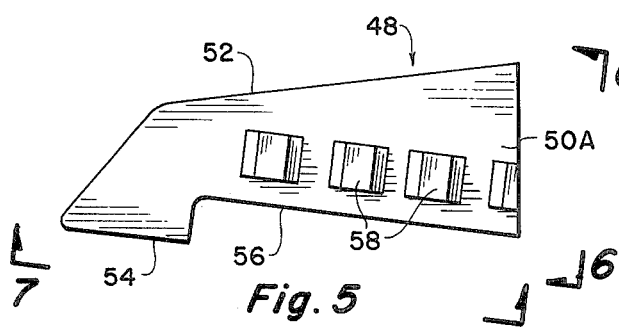
FIG. 5 is an elevational view of one side of a wedge as utilized in the holder housing.
Figure 6:
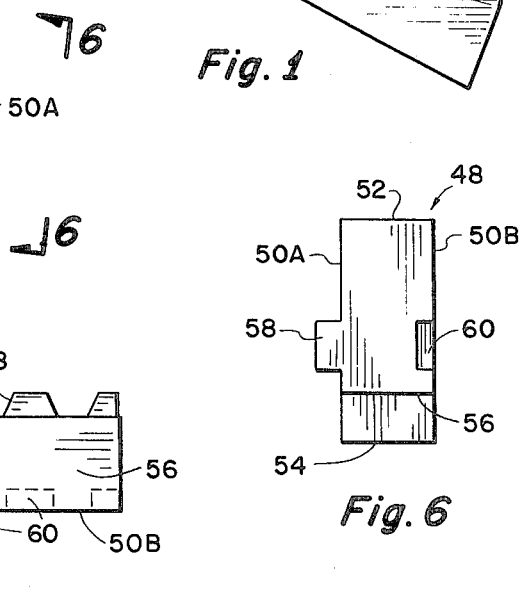
FIG. 6 is an end view of the wedge of FIG. 5.
Figure 7:
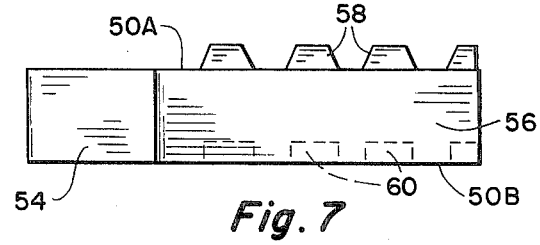
FIG. 7 is a bottom view of the wedge of FIG. 5.

Positioned within a completed holder housing is a tapered wedge generally indicated by the numeral 48 as shown in FIGS. 5 through 7. The wedge 48 has parallel side surfaces 50A and 50B which are spaced apart by dimension less than the spacing between the side surfaces 38A and 38B of the holder housing cavity. The wedge 48 has tapered top and bottom surfaces 52 and 54 respectively. Formed in the bottom surface 54 is cut out 56 which receives rollers in a manner to be described subsequently.

Side 50A of the wedge 48 has rack means 58 in the form of protruding teeth. The teeth forming the rack means 58 may be forged from the wedge 48 by forging pressure applied to side 50B which will result in recesses 60. The recesses 60 form no part in the operation of the wedge.

Figure 9:
FIG. 9 is an end view of the spring of FIG. 8.
Figure 8:
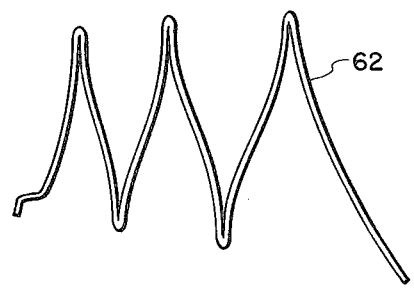
FIG. 8 is a side view of the spring employed in the holder housing.

A spring 62 as shown in FIGS. 8 and 9 is employed to urge the wedge 48 towards the narrow end of the assembled holder housing 34.

Figure 1:
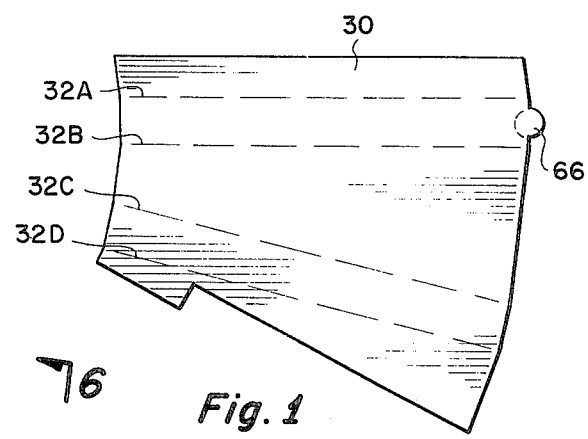
FIG. 1 is a plan view of a sheet of metal cut to preselected dimensions which may be folded along four lines to form the holder housing as employed in the invention.
Figure 10:
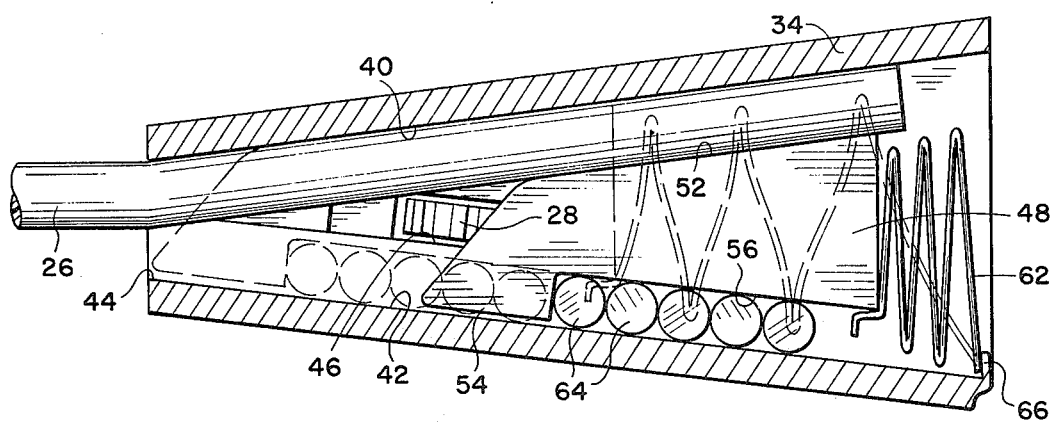
FIG. 10 is a cross-sectional view of the holder housing as employed in this invention showing a fishing line received therein.

Referring to FIG. 10 the assembled holder housing is shown in cross-sectional view. Wedge 48 is shown retracted with fishing line 26 positioned between the wedge upper surface 32 and the holder housing cavity top surface 40. Line 46 is retained in the housing against pull since any force tending to pull the line out of the housing increases the force of contact of the wedge against the line. To insure low friction movement of the wedge 48 within the housing, a plurality of roller bearings 64 are positioned in the cut out 56 in the bottom of the wedge. When a line is not received in the housing the wedge 48 is in the forward position as shown in dotted outline, being moved there by spring 62 which is also shown in dotted outline. A spring retainer 66 extends upwardly from the cavity bottom surface 42 and is formed integrally from the sheet of metal 30 as shown in FIG. 1.

Figure 13:
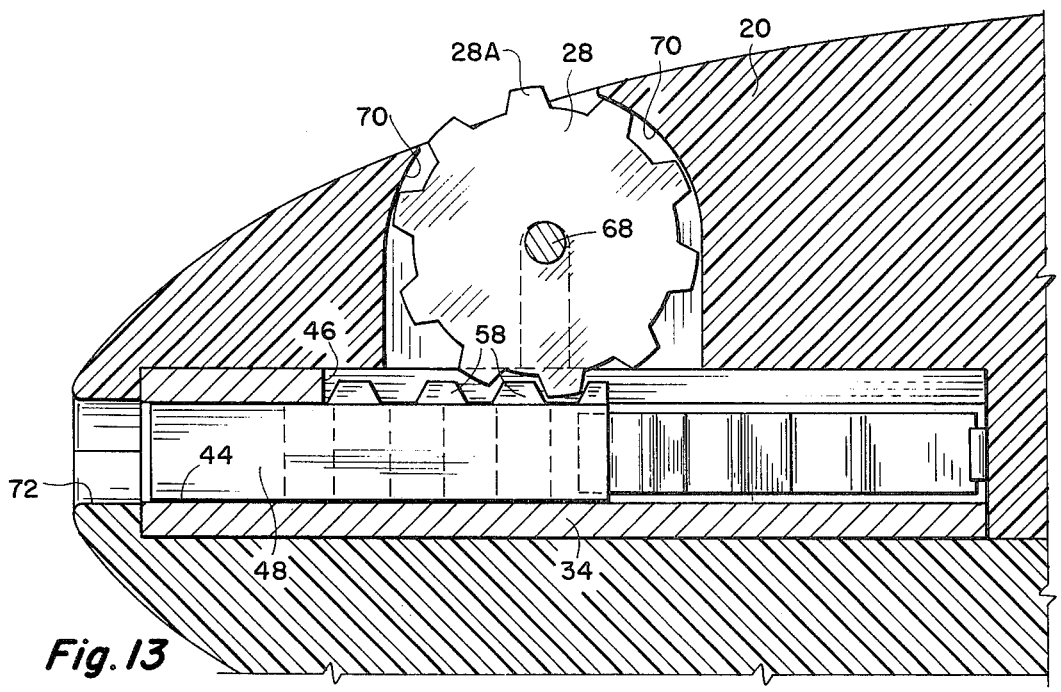
FIG. 13 is a partial cross-sectional of a fishing lure having the line holder therein, the view being taken along the line 13—13 of FIG. 16.

In order to release line 26 from the holder housing 34, and thereby from the lure, wedge 48 must be moved in the rearward direction. To accomplish this, an actuator 28 is employed. In FIG. 13 the actuator shown is in the form of a gear 28 having teeth 28 extending from the peripheral surface. The gear actuator 28 is rotatably supported about an axle 68 which is retained in the lure body (see FIG. 12). The teeth 28 of the actuator gear engage the rack teeth 58 of the wedge 48. The lure body has an actuator slot opening 70 therein which is in alignment with the slot 46 in holder housing 34. The gear actuator 28 is positioned in actuator slot 70 in such a way that a portion of the periphery of the gear extends externally of the lure body 20 as seen in FIG. 11. The user, with his fingernail, a knife edge, or the like, may rotate the gear actuator 28 to thereby displace the wedge 34 when necessary to position a line within the lure, or to release a line from the lure. As shown in FIG. 13, the lure body has a forward opening 72 in alignment with the opening 44 of the holder housing 34 in which the fishing line 26 is inserted.

Figure 12:
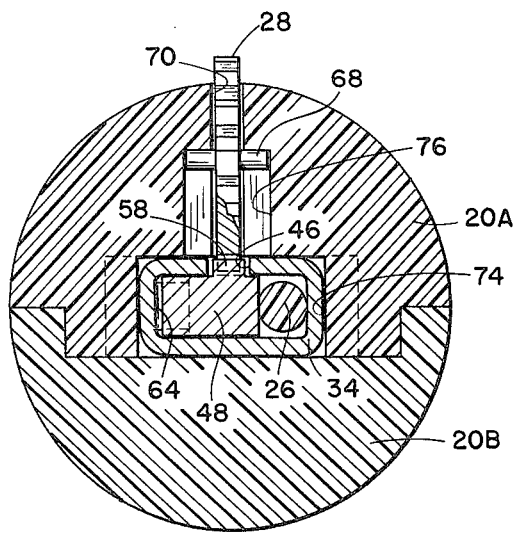
FIG. 12 is a cross-sectional view of the fishing lure taken along the line 12—12 of FIG. 11.
Figure 14:
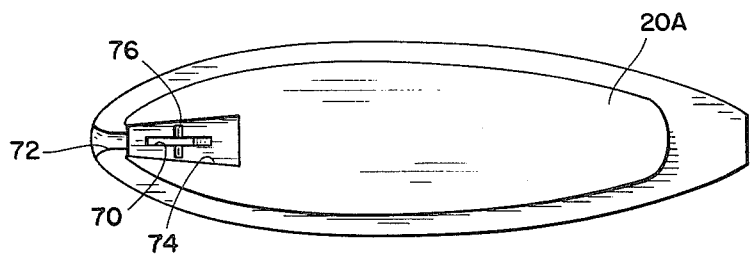
FIG. 14 is a cross-sectional view showing a bifurcated portion of the lure of FIG. 11 taken along the line 14—14 of FIG. 11.
Figure 15:
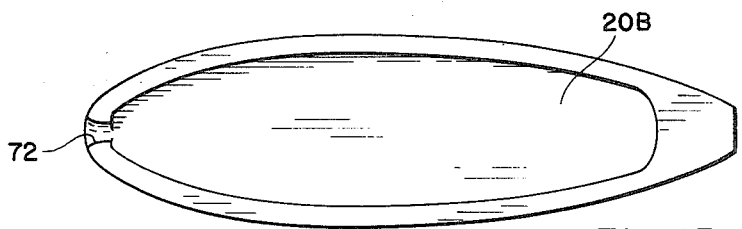
FIG. 15 is a view taken along the lines 15—15 of FIG. 11 showing the other longitudinal bifurcated portion of the lure.
Figure 16:
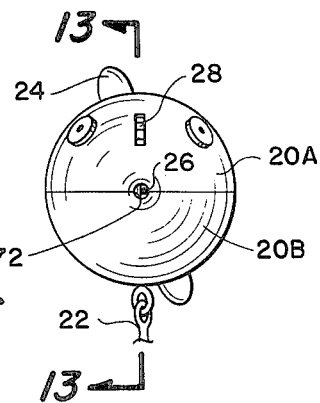
FIG. 16 is a front view of the completed fishing lure of FIG. 11.

One method of assembling the fishing lure having the quick fishing line grasping and releasing means of this invention is illustrated in FIGS. 12, 14 and 15. In this arrangement the lure body is first formed of two longitudinally bifurcated portions, one portion 20A as shown in FIG. 14, and the other portion 20B being shown in FIG. 15. In the upper portion 20A a holder housing recess 74 is provided of dimensions to closely receive the assembled holder housing 34 with the wedge, spring and roller bearings mounted therein. It can be seen in FIG. 12 that the actuator slot 70 communicates with the slot 46 formed in the lure body. In addition, an axle slot 76 receives the short axle 68 which rotatably supports the actuator gear 28. In assembly of the lure, the actuator gear 28 with axle 68 attached is first dropped into intersecting slots 70 and 76 in lure body portion 20A. The completed holder housing 34 is positioned in the holder housing recess 74 so that slot 46 aligns with actuator slot 70. Finally, the body lower portion 24B is secured to the body upper portion 20A by means of adhesive. An exterior covering of the assembled lure may then be applied along with fish hooks 22, spinner 24, and any other elements attached to form the completed fishing lure which, as previously indicated, in the final form may not resemble that illustrated in the drawings.

It is understood that the invention is limited to the embodiment set forth herein but is to be limited only by the scope of the attached claim or claims, including the full range of equivalency to which each element thereof is entitled.

What is claimed:
1. A fishing lure having a quick grasp and release line holder comprising:
 a lure body having a fish line receiving opening in the front end thereof, and an actuator slot opening on one side of said body spaced from said line receiving opening;
 a holder housing having an internal cavity, the cavity being defined by a rectangular cross-section formed of first and second parallel side walls and a top and bottom which are tapered towards each other with a selected angle therebetween, the small end of the cavity opening to the outside of the housing, the housing having a slot opening therein parallel the cavity bottom surface intersecting one of the cavity side walls, the housing being positioned within said lure body so that the opening in the small end of the cavity is in alignment with said fish line receiving opening in said lure body, and the slot opening is in alignment with said actuator slot opening in said lure body;
 a tapered wedge inside said holder housing cavity, said wedge having parallel side surfaces spaced apart by a dimension less than the spacing between said first and second side walls of said cavity, and tapered top and bottom edges, the angle of taper being the same as the angle of taper of said top and bottom cavity walls;
 spring means in said holder housing urging said wedge toward the small end of said cavity; and
 an actuator positioned in said lure body actuator slot opening, the inner end of the actuator extending through said slot in said holder housing and in engagement with said wedge, the outer end of the actuator extending externally of said lure body through said actuator slot for engagement by the user to retract said wedge against the force of said spring towards the large end of said cavity to permit the insertion of a line through the line receiving opening in said lure body and said opening in the small end of said holder housing to position the line between said cavity top surface and said wedge top edge.

2. A fishing lure having a quick grasp and release line holder according to claim 1 wherein said side surface of said wedge facing said housing slot opening has rack means thereon and wherein said actuator is in the form of a rotatable gear means engaging said rack means in a portion of the periphery of the gear means extending through said lure body actuator slot for engagement by the user.

3. A fishing lure having a quick grasp and release line holder according to claim 2 wherein said gear means is rotatably supported by an axle received in said lure body.

4. A fishing lure having a quick grasp and release line holder according to claim 1 in which one of said top surfaces of said wedge and said top surface of said cavity is roughened to provide a high coefficient of friction to more securely grasp a fishing line inserted therebetween.

5. A holder according to claim 1 including a plurality of rollers positioned between said wedge bottom edge and said cavity bottom surface.

6. A holder according to claim 1 wherein said lure body is assembled of longitudinally bifurcated portions, one of the portions having a holder housing recess therein in which said holder housing is positioned prior to the assembly of the portions.

7. A holder according to claim 1 wherein said holder housing is formed of a single flat sheet of metal, precut to select dimensions, the sheet being folded along four lines forming the corners of said holder housing cavity.

* * * * *